United States Patent [19]

Matsui

[11] 4,364,062

[45] Dec. 14, 1982

[54] PAPER EDGE DETECTION IN A PRINTER

[75] Inventor: Hirotoshi Matsui, Nara, Japan

[73] Assignee: Sharp Kabushiki Kaisha, Osaka, Japan

[21] Appl. No.: 266,130

[22] Filed: May 21, 1981

[30] Foreign Application Priority Data

May 27, 1980 [JP] Japan .................................. 55-71197

[51] Int. Cl.[3] .............................................. G01D 15/18

[52] U.S. Cl. ........................................................ 346/75

[58] Field of Search .................................. 346/75, 140

[56] References Cited

U.S. PATENT DOCUMENTS 3,805,274 4/1974 Kashio .................................. 346/75

3,928,718 12/1975 Sagae et al. ........................ 346/75 X 4,019,187 4/1977 Omori et al. .......................... 346/75

4,027,310 5/1977 Baker et al. ........................... 346/75

*Primary Examiner*—Donald A. Griffin

*Attorney, Agent, or Firm*—Birch, Stewart, Kolasch & Birch

[57] ABSTRACT

A printer system includes a carriage for accomodating a printer head therein. The carriage is driven to travel in the lateral direction along the surface of a recording paper while the actual printing operation is conducted. A paper edge detection system is incorporated in the carriage for detecting a left edge of the recording paper when the carriage is driven to travel rightward. The print control system develops a print enabling signal when a preselected period of time has passed after the paper edge detection system detects the left edge of the recording paper.

10 Claims, 4 Drawing Figures

PAPER EDGE DETECTION IN A PRINTER

BACKGROUND AND SUMMARY OF THE INVENTION

The present invention relates to a printer including a printer head carriage such as an ink jet system printer, a discharge type printer and a wire dot printer and, more particularly, to a paper edge detection system in a printer including a travelling printer head.

Recently, a word processing system has been developed. The word processing system generally employs a printer system having a travelling printer head. In such a word processing system, it is required that the printing operation is conducted in a predetermined format even when the recording paper is changed. Further, the size of the recording paper is not fixed. Thus, in such a word processing system, it is strictly required that the recording paper is accurately set at a predetermined position in order to ensure the printing of the predetermined format. If the recording paper is not set at the predetermined position, a clean printing can not be ensured even when the printing operation is conducted in accordance with the predetermined print format.

Accordingly, an object of the present invention is to provide a control system for ensuring an accurate format printing in a printer employing a travelling printer head.

Another object of the present invention is to provide a paper edge detection system in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a paper edge detection system is provided for detecting, especially, the left edge of the recording paper inserted into a printer system. A printer control system functions to determine the left print margin after the paper edge detection system develops the detection signal and, therefore, an accurate format printing is ensured even when the recording paper is not set at a predetermined position.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
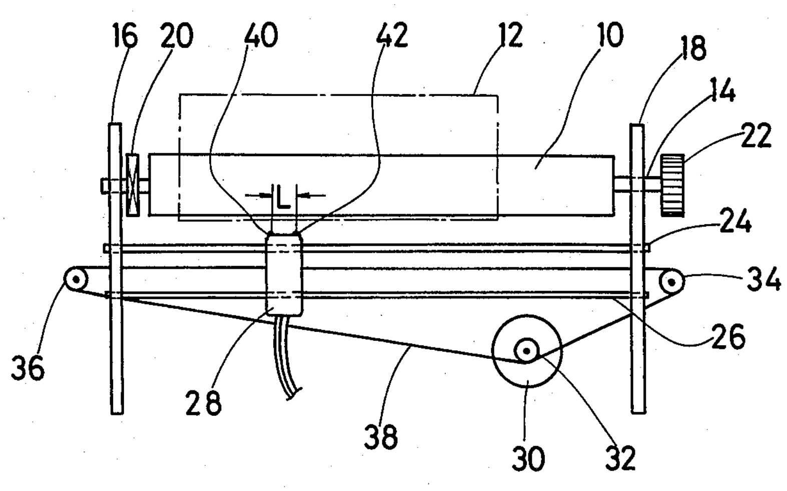
FIG. 1 is a plan view of an essential part of a printer including an embodiment of a paper edge detection system of the present invention.

FIG. 1 shows an essential part of an ink jet system printer of the charge amplitude controlling type which embodies the present invention.

The printer of FIG. 1 includes a platen 10 made of an optically nonreflective material such as rubber. The platen 10 functions to support a recording paper 12. the platen 10 is supported by a platen shaft 14, and the platen shaft 14 is rotatably supported by side walls 16 and 18. One end of the platen shaft 14 is associated with a gear mechanism 20 for automatically feeding the recording paper in the vertical direction or in the column direction. The other end of the platen shaft 14 is fixed to a knob 22 for manually feeding the recording paper 12.

A pair of guide rails 24 and 26 are disposed in front of the platen 10 in a fashion to parallel the platen 10. A carriage 28 is slidably mounted on the pair of guide rails 24 and 26 so that the carriage 28 travels in the lateral direction or in the row direction. A carriage drive mechanism includes a drive motor 30, a pulley 32 fixed to the drive shaft of the drive motor 30, and a pair of pulleys 34 and 36 positioned at the both ends of the guide rails 24 and 26. A drive wire 38 is extended between the pulleys 32, 34 and 36, and the carriage 28 is secured to the drive wire 38. Therefore, the carriage 28 is driven to travel in the lateral direction in response to the rotation of the drive motor 30.

Figure 3:
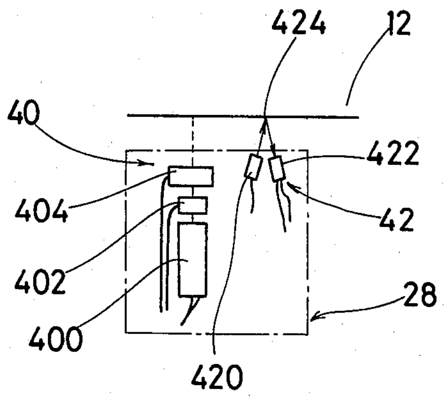
FIG. 3 is a plan view of a carriage included in the printer of FIG. 1.

The carriage 28 carries a printer head 40, and a paper edge detection system 42 of the present invention. FIG. 3 shows the construction of the carriage 28. In this embodiment, the printer head 40 comprises an ink jet system printer of the charge amplitude controlling type.

The printer head 40 includes an ink droplet issuance unit 400 for emitting ink droplets at a given frequency. More specifically, the ink droplet issuance unit 400 includes a nozzle to which ink liquid of a predetermined pressure is applied, and an electromechanical transducer attached to the nozzle. An excitation signal of a given frequency is applied to the electromechanical transducer for providing the ink droplets of the given frequency. A charging tunnel 402 is disposed in front of the ink droplet issuance unit 400 in order to charge the ink droplets in accordance with print information. A pair of deflection electrodes 404 are disposed in front of the charging tunnel 402 to establish a constant electric field of a high voltage. The charged ink droplets are deflected while they pass through the constant electric field in accordance with the charge amount carried thereon. The deflection is conducted in the vertical, namely column direction, and the deflected ink droplets are directed to the recording paper 12 to print a desired symbol in a dot matrix fashion. The carriage 28 is driven to travel in the lateral direction at a constant speed while the actual printing operation is conducted. That is, the row direction displacement is achieved by the movement of the carriage 28 in the lateral direction.

Figure 2:
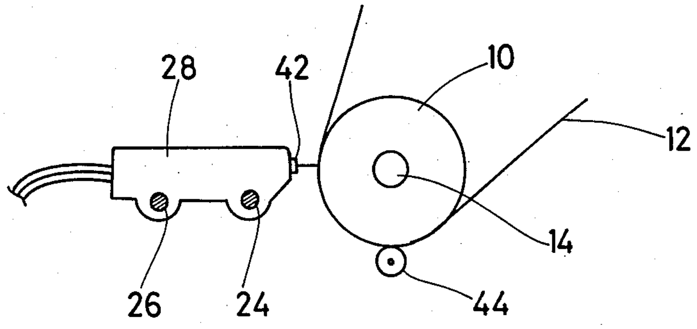
FIG. 2 is a sectional view of an essential part of the printer of FIG. 1.

A paper feed froller 44 is disposed under the platen 10 to contact the platen 10 as shown in FIG. 2, whereby the recording paper 12 is sandwiched between the platen 10 and the paper feed roller 44 and the recording paper 12 is fed in the vertical direction in response to the rotation of the platen 10.

The paper edge detection system 42 incorporated in the carriage 28 includes a light emitting element 420 and a light responsive element 422. When the recording paper 12 is lot located at a detection point 424, the light responsive element 422 does not receive the reflected light because the platen 10 is made of the optically nonreflective material. When the recording paper 12 (normally white) is located at the detection point 424, the light responsive element 422 receives the light emitted from the light emitting element 420 and reflected at the surface of the recording paper 12. The paper edge detection is conducted in this manner.

The printer head 40 and the paper edge detection system 42 are spaced apart from each other in the lateral direction by a distance L. In the normal printing operation, the carriage 28 is driven to travel rightward to achieve the actual printing operation. Thus, the paper edge detection system 42 is positioned in advance of the printer head 40 by the distance L. It will be clear that other printer systems can be employed instead of the ink jet system printer of the charge amplitude controlling type.

Figure 4:
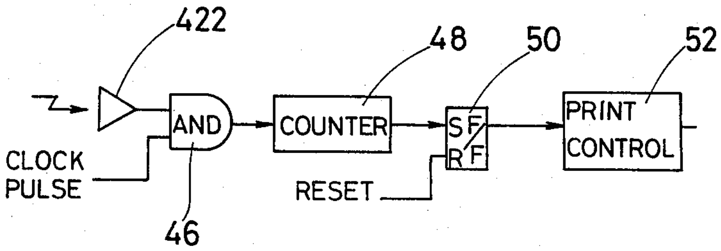
FIG. 4 is a block diagram of an essential part of a print control system included in the printer of FIG. 1.

FIG. 4 schematically shows an embodiment of a print timing control system which responds to a detection signal derived from the paper edge detection system 42.

When the reflected light impinges on the light responsive element 422, the light responsive element 422 develops a detection output which enables an AND gate 46. The other input terminal of the AND gate 46 receives a timing signal representative of the carriage movement. Now assume that the carriage 28 is driven to travel rightward and the left edge of the recording paper 12 is detected by the paper edge detection system 42. In response to the detection of the left edge of the recording paper 12, the AND gate 46 develops the timing signal representative of the carriage movement. That is, the pulse number developed from the AND gate 46 indicates the carriage position measured from the left edge of the recording paper 12. The pulse signal developed from the AND gate 46 is applied to a counter 48.

The counter 48 is constructed to develop a control signal when the counter 48 counts the pulse signal corresponding to the distance L provided between the printer head 40 and the paper edge detection system 42. More specifically, the control signal is developed from the counter 48 when the printer head 40 reaches the left edge of the recording paper 12. The control signal developed from the counter 48 is applied to a flip-flop 50 to set the flip-flop 50. The flip-flop 50 develops a set output to a print control circuit 52 to start the actual printing operation in accordance with the print format set by the operator. In the actual word processor system, the left margin space is preset in the print control circuit 52 and, therefore, the actual printing operation is conducted in accordance with the print information when the preselected left margin space has passed after the printer head 40 reaches the left edge of the recording paper 12.

When the paper edge detection system 42 is located below the printer head 40, that is when the paper edge detection system is not spaced apart from the printer head 40 in the lateral direction, the counter 48 can be omitted.

It will be clear that the present paper edge detection system can be applied to detect the front edge of the recording paper 12 for controlling the upper marging of the print format.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer comprising:
a record receiving member;
a printer head including:
an ink droplet issuance unit for emitting ink droplets toward said record receiving member, charging means for charging said ink droplets in accordance with print information, and deflection means for deflecting said charged ink droplets in the vertical direction:
a carriage for accomodating said printer head therein; drive means for driving said carriage in the lateral direction in front of said record receiving member; paper edge detection means for developing a detection output when said carriage reaches the left edge of said record receiving member while said carriage is driven to travel rightward; and print timing control means for developing an enabling signal toward said charging means when a preselected time has passed after said detection output is developed from said paper edge detection means.

2. A printing device comprising
a recording medium and a carriage, said recording medium being disposed in front of said carriage,
said carriage containing a printing head for conducting a printing operation and an optical recording medium edge detection system, both of said printing head and said optical detection system facing said recording medium, and
means for moving said carriage in the lateral direction across said recording medium, whereby said printing head effects a printing operation and said optical detection system detects the edge of said recording medium.

3. The printer of claim 2, further comprising: a print timing control circuit for enabling said printing operation when a predetermined period of time has passed after said recording medium edge detection system detects said left edge of said recording paper.

4. The printing device of claim 2 or 3 wherein the optical recording medium edge detection system comprises
a light emitting element for emitting a light beam toward said recording medium, and
a light responsive element which responds to the light beam emitted from said light emitting element and reflected at the surface of said recording medium.

5. The printing device of claim 4 wherein the recording medium is supported by a platen which feeds the recording medium in the vertical direction.

6. The printing device of claim 5 wherein the recording medium is optically reflective and the platen is optically nonreflective.

7. The printing device of claim 6 wherein the recording medium is paper and the platen is made of rubber.

8. The printing device of claim 2 wherein the printing head comprises an ink jet system printer of the charge amplitude controlling type.

9. The printing device of claim 2 wherein the edge detection system is spaced apart from and disposed in advance of the printing head.

10. An ink jet system printer comprising
a record receiving member and a carriage, said record receiving member being disposed in front of said carriage, drive means for driving said carriage in the lateral direction in front of said record receiving member, said carriage containing a printing head and a paper edge detection means said printing head including an ink droplet issuance unit for emitting ink droplets toward said record receiving member, charging means for charging said ink droplets in accordance with print information, and deflection means for deflecting said charged ink droplets in the vertical direction;

said paper edge detection means developing a detection output when said carriage reaches the left edge of said record receiving member while said carriage is driven to travel rightward; and print timing control means for developing an enabling signal toward said charging means when a preselected time has passed after said detection output is developed from said paper edge detection means.

* * * * *